US012726906B2

(12) United States Patent
Joshi et al.

(10) Patent No.: US 12,726,906 B2
(45) Date of Patent: Sep. 1, 2026

(54) OPTIMIZING POWER CONSUMPTION IN IOT DEVICES WITH TWT USING LONG SLEEP INTERVALS

(71) Applicant: Silicon Laboratories Inc., Austin, TX (US)

(72) Inventors: Atul Suresh Joshi, Pune (IN); Nitesh Kumar Shah, Hyderabad (IN); Ram Krishna Poricha, Hyderabad (IN); Seemakurty S N S V R Ritesh, Kakinada (IN); Sunit Pujari, Hyderabad (IN)

(73) Assignee: Silicon Laboratories Inc., Austin, TX (US)

(*) Notice: Subject to any disclaimer, the term of this patent is extended or adjusted under 35 U.S.C. 154(b) by 365 days.

(21) Appl. No.: 18/389,408

(22) Filed: Nov. 14, 2023

(65) Prior Publication Data

US 2025/0106775 A1 Mar. 27, 2025

Related U.S. Application Data

(63) Continuation-in-part of application No. 18/371,244, filed on Sep. 21, 2023, now Pat. No. 12,593,277.

(51) Int. Cl.

| | |
|---|---|
| ***H04W 52/02*** | (2009.01) |
| ***H04W 56/00*** | (2009.01) |
| ***H04W 84/12*** | (2009.01) |

(52) U.S. Cl.
CPC ..... *H04W 52/0248* (2013.01); *H04W 56/001* (2013.01); *H04W 84/12* (2013.01)

(58) Field of Classification Search
CPC .......................... H04W 52/0216; H04W 84/12
See application file for complete search history.

(56) References Cited

U.S. PATENT DOCUMENTS

| | | | | |
|---|---|---|---|---|
| 7,937,232 | B1 * | 5/2011 | Chow | G05B 21/02 713/400 |
| 2013/0279381 | A1 * | 10/2013 | Sampath | H04W 56/00 370/336 |

(Continued)

OTHER PUBLICATIONS

Office Action mailed Sep. 24, 2025 in co-pending U.S. Appl. No. 18/371,244.

(Continued)

*Primary Examiner* — Joseph A Bednash
(74) *Attorney, Agent, or Firm* — Nields, Lemack & Frame, LLC

(57) ABSTRACT

Methods and Wi-Fi devices that utilize the target wait time (TWT) feature of the Wi-Fi specification are disclosed. These methods reduce power consumption by selectively listening to only a portion of the beacons that are transmitted by the access point. In one scenario, the Wi-Fi device only listens to one beacon per TWT wake interval. In another embodiment, the Wi-Fi device may have knowledge of the application that is being executed, such as its allowable latency. The Wi-Fi device may use this allowable latency to determine when to exit low power mode to receive a beacon. Further, mechanisms to ensure that the connection between the Wi-Fi device and the access point are also disclosed. Additionally, techniques to maintain synchronization between the Wi-Fi device and the access point are disclosed.

19 Claims, 12 Drawing Sheets

(56) References Cited

U.S. PATENT DOCUMENTS

| | | | | |
|---|---|---|---|---|
| 2015/0189614 | A1* | 7/2015 | Tian | H04B 7/0413<br>370/350 |
| 2015/0244619 | A1* | 8/2015 | Zheng | H04L 1/0061<br>370/392 |
| 2017/0195954 | A1* | 7/2017 | Ghosh | H04W 52/0219 |
| 2019/0045438 | A1* | 2/2019 | Cariou | H04W 52/0229 |
| 2019/0253967 | A1 | 8/2019 | Xiao et al. | |
| 2020/0267644 | A1* | 8/2020 | Rajib | H04W 52/0216 |
| 2025/0106760 | A1 | 3/2025 | Ritesh et al. | |

OTHER PUBLICATIONS

Notice of Allowance mailed Feb. 11, 2026 in co-pending U.S. Appl. No. 18/371,244.

* cited by examiner

OPTIMIZING POWER CONSUMPTION IN IOT DEVICES WITH TWT USING LONG SLEEP INTERVALS

This application is a continuation in part of U.S. patent application Ser. No. 18/371,244, filed Sep. 21, 2023, the disclosure of which is incorporated by reference in its entirety.

FIELD

This disclosure describes a system and various methods to implement TWT (Target Wake Time) with a low power Wi-Fi device.

BACKGROUND

The Wi-Fi protocol was originally designed to include devices which have access to unlimited power. Thus, early revisions of the specification did not include any provisions to support low power devices, which need to enter low power modes in order to conserve battery life. For example, some devices, such as sensor devices, should ideally have a battery life that is more than one year.

Later, the Wi-Fi protocol was updated to include some power saving modes of operation. For example, one such update is the inclusion of PS-Poll. In this mode, the low power Wi-Fi device notifies the access point that it is entering a sleep mode. The access point will then buffer all outbound messages for this low power Wi-Fi device. If it has any outbound packets for this device, it indicates this in its beacon message. After waking, the low power Wi-Fi device checks the beacon and if there are stored messages, it transmits a packet to the access point requesting the stored packets.

A more recent update is the inclusion of Target Wake Time (TWT). This feature allows the low power Wi-Fi device to specify when it will be awake and for how long. When implemented, all data for the low power Wi-Fi device are transmitted during a predetermined interval referred to as the TWT service period. This is intended to allow longer periods of sleep mode and also reduce contention by allotting specific intervals for transmissions to each low power Wi-Fi device.

FIG. 1 shows the timing associated with target wait times. This figure shows two types of devices, an access point (or AP) and a device, also referred to as a station (STA). A schedule is negotiated between the access point and station. There are several parameters associated with this feature. These parameters include the TWT wake interval and the TWT wake duration. The TWT wake interval defines the frequency at which the station will awake. The TWT wake duration defines the period of time that the station is awake during each TWT wake interval. This awake time is known as TWT service period. Note that the station may be in low power mode (doze) during the period between completion of the TWT service period and the start of the next TWT service period. Note that the station does not need to remain awake for the entire TWT service period. For example, the access point may transmit an "end of service period" (EOSP) message, which indicates that there is no other data for the station, and the station may enter its low power mode. Additionally, the access point may transmit packets to the station, where the last packet contains an indication that no additional data will be forthcoming. If either of these events occurs, the station may enter low power mode before the end of the negotiated TWT wake duration.

Note that the TWT feature may define several modes of operation, announced and unannounced. In unannounced operation, the access point assumes that the station is awake during each TWT service period and therefore will send packets to the station at this time. In the announced operation, the station must first transmit a packet to the access point indicating that it is awake before the access point can transmit any packets to the station. In this way, the station may not wake up for every TWT service period.

While this feature allows devices in the Wi-Fi network to have a low power mode, there are complications associated with this feature that need to be addressed. For example, depending on the values of the TWT wake interval and TWT wake duration, the low power device may still be active a large percentage of the time. Further, depending on the application being executed by the low power device, receive/transmit data latency may be a concern to be addressed, along with the throughput requirements of the application.

Therefore, it would be beneficial if there was a system and method that allows low power Wi-Fi devices to utilize the Target Wake Time feature while overcoming these shortcomings.

SUMMARY

Methods and Wi-Fi devices that utilize the target wait time (TWT) feature of the Wi-Fi specification are disclosed. These methods reduce power consumption by selectively listening to only a portion of the beacons that are transmitted by the access point. In one scenario, the Wi-Fi device only listens to one beacon per TWT wake interval. In another embodiment, the Wi-Fi device may have knowledge of the application that is being executed, such as its allowable latency and the throughput requirements. The Wi-Fi device may use these allowable latency and throughput requirements to determine when to exit low power mode to receive a beacon and which TWT service periods to be active. Further, mechanisms to ensure that the connection is maintained between the Wi-Fi device and the access point are also disclosed. Additionally, techniques to maintain synchronization between the Wi-Fi device and the access point are disclosed.

According to one embodiment, a method of reducing power consumption in a low power Wi-Fi device is disclosed. The method comprises negotiating target wait time (TWT) parameters with an access point, wherein the TWT parameters include a TWT wake interval duration, and a TWT wake duration, wherein the TWT wake duration defines a duration of a TWT service period; configuring the low power Wi-Fi device to exit a low power mode once per TWT wake interval to receive one beacon from the access point; and returning to low power mode after receiving the one beacon. In some embodiments, the one beacon is a last beacon that occurs prior to a TWT service period. In some embodiments, the low power Wi-Fi device parses the one beacon to determine whether the access point has any data pending for the low power Wi-Fi device. In certain embodiments, if the access point has data pending for the low power Wi-Fi device, the low power Wi-Fi device exits low power mode during a next TWT service period and receives the data from the access point. In certain embodiments, if the access point does not have data pending for the low power Wi-Fi device, the low power Wi-Fi device does not exit low power mode during a next TWT service period.

According to another embodiment, a method of reducing power consumption in a low power Wi-Fi device is disclosed. The method comprises negotiating target wait time (TWT) parameters with an access point, wherein the TWT parameters include a TWT wake interval duration, an announce mode of operation and a TWT wake duration, wherein the TWT wake duration defines a duration of a TWT service period; estimating a tolerable latency period associated with an application executing on the low power Wi-Fi device; configuring the low power Wi-Fi device to exit a low power mode once per latency period to receive one beacon from the access point; and returning to low power mode after receiving the one beacon. In some embodiments, the low power Wi-Fi device parses the one beacon to determine whether the access point has any data pending for the low power Wi-Fi device. In certain embodiments, if the access point has data pending for the low power Wi-Fi device, the low power Wi-Fi device exits low power mode during a next TWT service period and transmits a packet to the access point to indicate that the low power Wi-Fi device is active and ready to receive the data. In certain embodiments, if the access point does not have data pending for the low power Wi-Fi device, the low power Wi-Fi device does not exit low power mode during a next TWT service period. In some embodiments, the application provides an indication that it has data to transmit to the access point, and the low power Wi-Fi device exits low power mode during a next TWT service period after the indication and transmits the data to the access point. In certain embodiments, after transmitting the data, the low power Wi-Fi device modifies its operation so as to wake to receive at least one beacon during each subsequent TWT wake interval until it detects a beacon that indicates that the access point has a response pending for the low power Wi-Fi device. In certain embodiments, if the access point has the response pending for the low power Wi-Fi device, the low power Wi-Fi device exits low power mode during a next TWT service period and transmits a packet to the access point to indicate that the low power Wi-Fi device is active and ready to receive the response. In some embodiments, the low power device measures an amount of time since a last communication to the access point. In certain embodiments, if the amount of time exceeds a predetermined value, the low power Wi-Fi device exits low power mode during a next TWT service period and transmits a packet to the access point such that a connection to the access point is not terminated.

According to another embodiment, a low power Wi-Fi device is disclosed. The low power Wi-Fi device comprises a Wi-Fi network interface; a processing unit; and a memory device in communication with the processing unit comprising an application executing on the low power Wi-Fi device and also comprising instructions, which when executed by the processing unit, cause the low power Wi-Fi device to: negotiate target wait time (TWT) parameters with an access point, wherein the TWT parameters include a TWT wake interval duration, an announce mode of operation and a TWT wake duration, wherein the TWT wake duration defines a duration of a TWT service period; estimate a tolerable latency period associated with the application executing on the low power Wi-Fi device; configure the low power Wi-Fi device to exit a low power mode once per latency period to receive one beacon from the access point; and return to low power mode after receiving the one beacon. In some embodiments, the low power Wi-Fi device parses the one beacon to determine whether the access point has any data pending for the low power Wi-Fi device. In certain embodiments, if the access point has data pending for the low power Wi-Fi device, the low power Wi-Fi device exits low power mode during a next TWT service period and transmits a packet to the access point to indicate that the low power Wi-Fi device is active and ready to receive the data. In certain embodiments, if the access point does not have data pending for the low power Wi-Fi device, the low power Wi-Fi device does not exit low power mode during a next TWT service period. In some embodiments, the low power device measures an amount of time since a last communication to the access point. In certain embodiments, if the amount of time exceeds a predetermined value, the low power Wi-Fi device exits low power mode during a next TWT service period and transmits a packet to the access point such that a connection to the access point is not terminated.

According to another embodiment, a method of reducing power consumption in a low power Wi-Fi device is disclosed. The method comprises negotiating target wait time (TWT) parameters with an access point, wherein the TWT parameters include a TWT wake interval duration, an announce mode of operation and a TWT wake duration, wherein the TWT wake duration defines a duration of a TWT service period; estimating a tolerable latency period associated with the low power Wi-Fi device; configuring the low power Wi-Fi device to exit a low power mode once per latency period to receive one beacon from the access point; and waking periodically to receive a portion of a beacon, referred to as a truncated beacon, wherein the truncated beacon is less than an entire beacon and comprises a MAC header and a timestamp field. In some embodiments, the periodic waking is based on time. In some embodiments, the periodic waking occurs every $N^{th}$ beacon, where N is an integer. In some embodiments, the periodic waking occurs once per TWT wake interval. In some embodiments, the periodic waking occurs every $M^{th}$ TWT wake interval, where M is an integer. In some embodiments, the low power Wi-Fi device wakes to receive at least one truncated beacon per latency period. In some embodiments, the low power Wi-Fi device uses a timestamp disposed in the timestamp field to synchronize an internal clock to that of the access point. In certain embodiments, the low power Wi-Fi device verifies that the timestamp is valid prior to using the timestamp to synchronize an internal clock to that of the access point. In certain embodiments, the low power Wi-Fi device estimates an expected range of values of the timestamp based on a prior timestamp and a duration since the prior timestamp, and compares the expected range of values to the timestamp contained in the timestamp field of the truncated beacon. In certain embodiments, the low power Wi-Fi device ignores the timestamp if the timestamp is not within the expected range of values. In certain embodiments, the low power Wi-Fi device enters a synchronization acquisition mode if the timestamp is not within the expected range of values. In certain embodiments, in synchronization acquisition mode, the low power Wi-Fi device attempts to receive a next beacon.

According to another embodiment, a low power Wi-Fi device is disclosed. The low power Wi-Fi device comprises a Wi-Fi network interface; a processing unit; and a memory device in communication with the processing unit comprising instructions, which when executed by the processing unit, cause the low power Wi-Fi device to: negotiate target wait time (TWT) parameters with an access point, wherein the TWT parameters include a TWT wake interval duration, an announce mode of operation and a TWT wake duration, wherein the TWT wake duration defines a duration of a TWT service period; estimate a tolerable latency period associated with the low power Wi-Fi device; configure the low power Wi-Fi device to exit a low power mode once per latency period to receive one beacon from the access point; and wake periodically to receive a portion of a beacon, referred to as a truncated beacon, wherein the truncated beacon is less than an entire beacon and comprises a MAC header and a timestamp field. In some embodiments, the low power Wi-Fi device uses a timestamp disposed in the timestamp field of the truncated beacon to synchronize an internal clock to that of the access point. In certain embodiments, the low power Wi-Fi device verifies that the timestamp is valid prior to using the timestamp to synchronize an internal clock to that of the access point. In certain embodiments, the low power Wi-Fi device estimates an expected range of values of the timestamp based on a prior timestamp and a duration since the prior timestamp, and compares the expected range of values to the timestamp contained in the timestamp field of the truncated beacon. In certain embodiments, the low power Wi-Fi device ignores the timestamp if the timestamp is not within the expected range of values. In certain embodiments, the low power Wi-Fi device enters a synchronization acquisition mode if the timestamp is not within the expected range of values. In certain embodiments, in synchronization acquisition mode, the low power Wi-Fi device attempts to receive a next beacon.

BRIEF DESCRIPTION OF THE DRAWINGS

For a better understanding of the present disclosure, reference is made to the accompanying drawings, in which like elements are referenced with like numerals, and in which.

DETAILED DESCRIPTION

This disclosure presents a system and method that describes enhancements that allow optimum use of the TWT feature.

Figure 1:
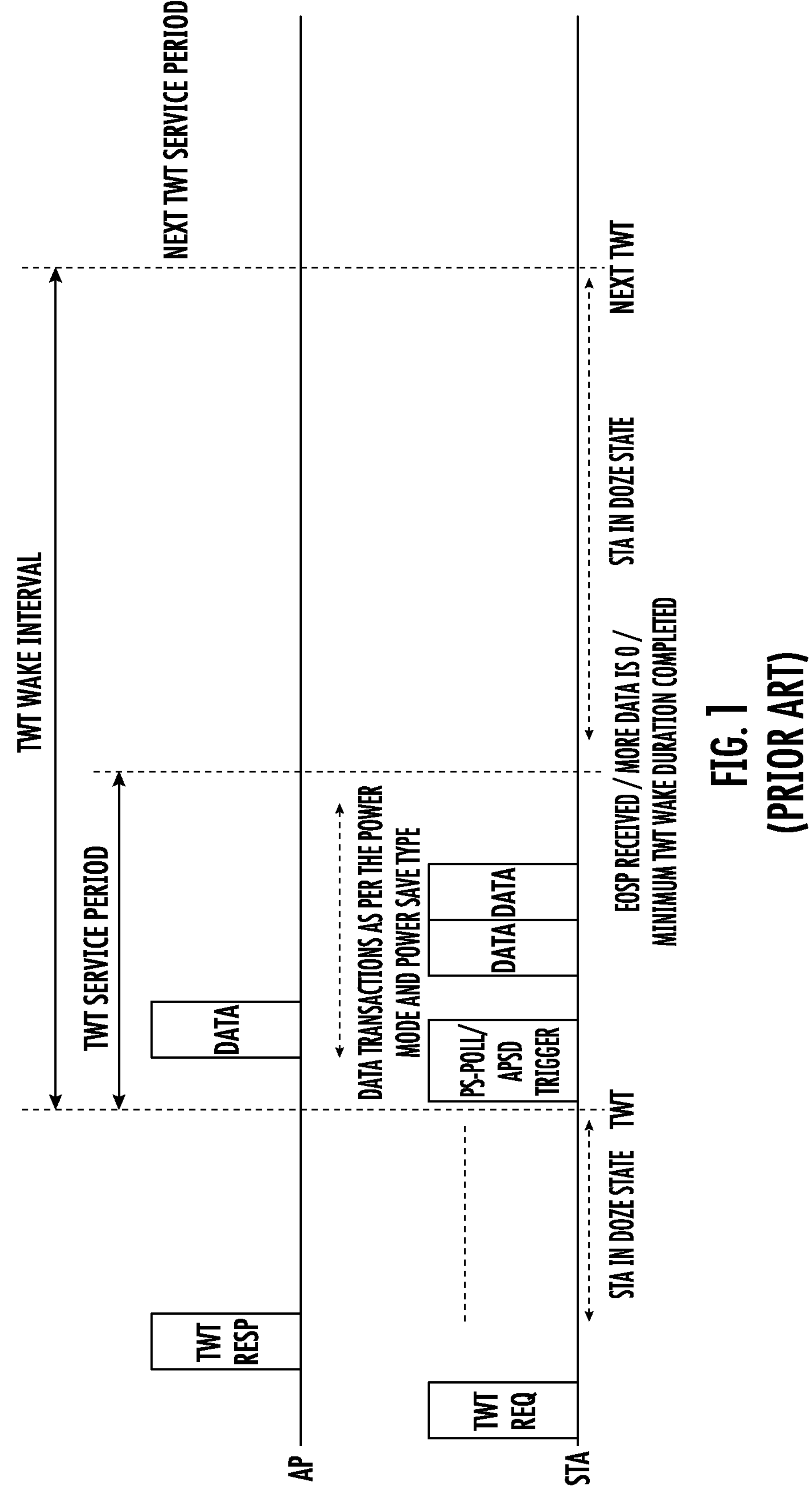
FIG. 1 shows a timing diagram showing the operation of the target wake time (TWT) feature with Station in low power mode.
Figure 2:
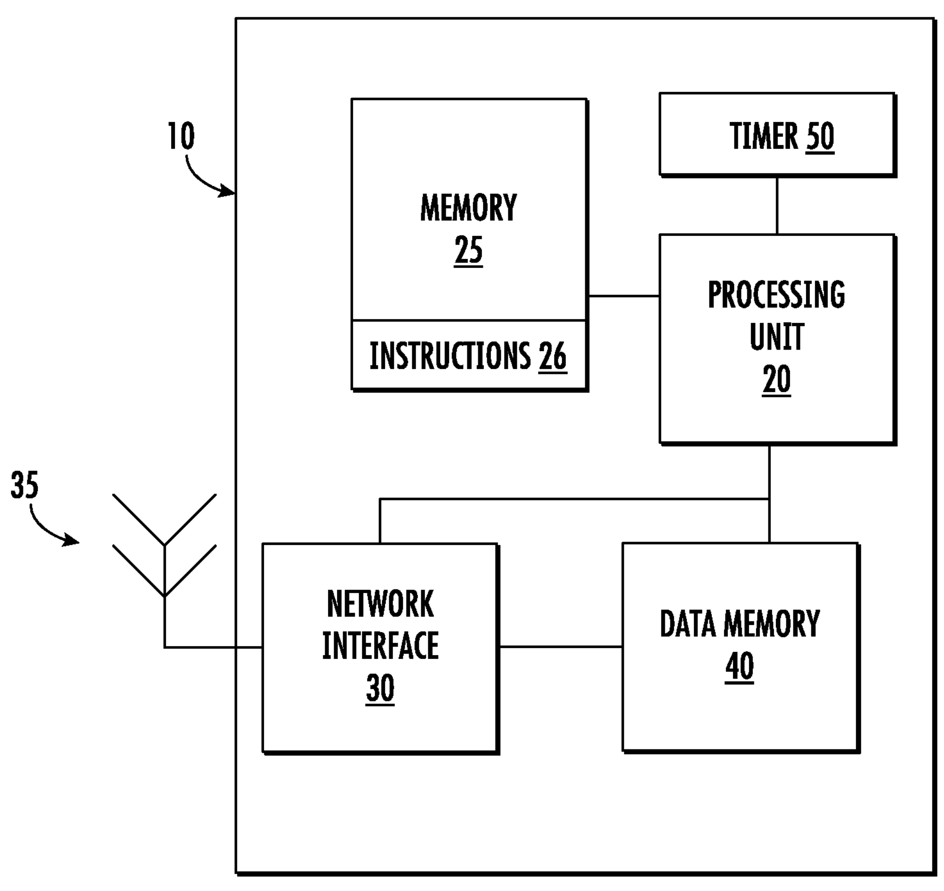
FIG. 2 shows a block diagram of a Wi-Fi network device.

FIG. 2 shows a block diagram of a representative Wi-Fi device 10 that may be used to implement the disclosed method of minimizing power consumption in a Wi-Fi network.

The Wi-Fi device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the Wi-Fi device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the Wi-Fi device 10. The instructions contained on this second computer readable non-transitory media may be downloaded onto the memory device 25 to allow execution of the instructions by the Wi-Fi device 10.

The Wi-Fi device 10 also includes a Wi-Fi network interface 30 that connects with a Wi-Fi network 100 using an antenna 35.

The Wi-Fi device 10 may include a data memory device 40 in which data that is received and transmitted by the Wi-Fi network interface 30 is stored. This data memory device 40 is traditionally a volatile memory. The processing unit 20 has the ability to read and write the data memory device 40 so as to communicate with the other devices in the Wi-Fi network 100.

Additionally, the Wi-Fi device 10 may include a timer 50. The timer 50 may be used to measure time durations. Further, the timer 50 may be used to wake the processing unit 20 from its low power or sleep mode.

Although not shown, the Wi-Fi device 10 also has a power supply, which may be a battery or a connection to a permanent power source, such as a wall outlet.

While the processing unit 20, the memory device 25, the Wi-Fi network interface 30, the data memory device 40 and the timer 50 are shown in FIG. 2 as separate components, it is understood that some or all of these components may be integrated into a single electronic component. Rather, FIG. 2 is used to illustrate the functionality of the Wi-Fi device 10, not its physical configuration.

In the wake state, all of the components described above may be powered. In the low power mode, one or more of these components may be in a sleep mode or powered off.

Figure 3:
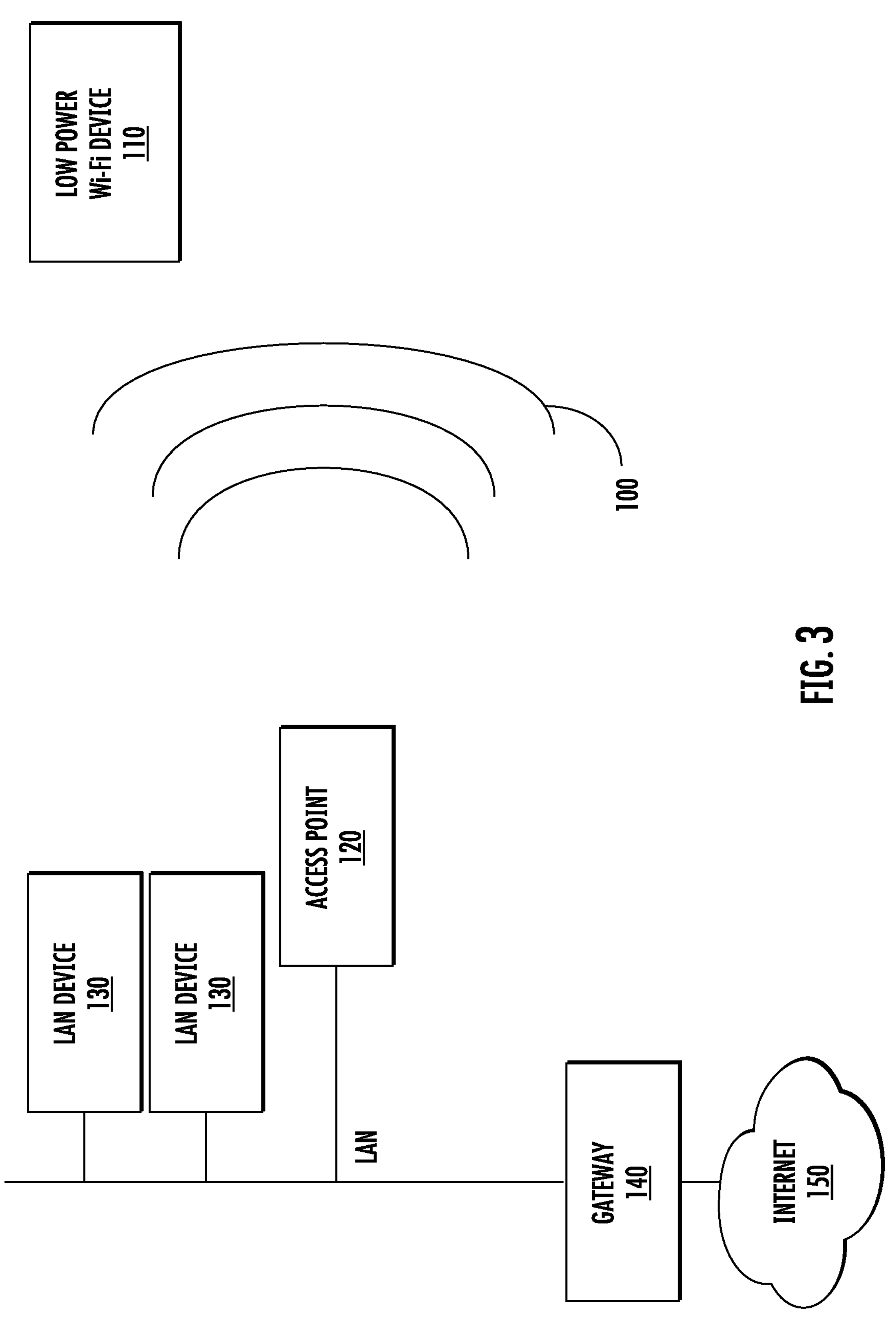
FIG. 3 shows a system that includes a Wi-Fi network.

FIG. 3 shows a system that includes a Wi-Fi network 100. The Wi-Fi network 100 includes a low power Wi-Fi device 110 and access point 120, both of which may have an architecture similar to that shown in FIG. 2. In other words, both low power Wi-Fi device 110 and access point 120 are Wi-Fi network devices. The low power Wi-Fi device 110 may have a battery as a power source and may include a lower power processing unit and less memory capacity than the access point 120.

The wireless network may include an access point, one or more controllers, one or more always-on nodes, which may serve as proxy nodes, and one or more low power Wi-Fi devices, also referred to as sleepy nodes. The access point serves as the network connectivity provider between the controllers, always-on nodes and sleepy nodes in the network. The controllers serve as the control point for a particular application. For example, a device may serve as the controller for a home automation network (or a "smart home"). This controller may coordinate lighting, switches, sensors, and other devices that allow the home to be controlled. Proxy devices are those nodes that are always powered on and have the ability to serve as the proxy for another node. Finally, sleepy nodes are nodes that may be in a low power mode for an extended period of time. There may be other types of devices as well. For example, there may be devices that are always powered on that cannot serve as a proxy node.

The access point 120 may also be in communication with a local area network (LAN). This LAN may be an Ethernet network, although other types of networks may be used. Also disposed on the LAN may be one or more LAN devices 130. These LAN devices 130 may include printers, personal computers, servers, and other devices. Additionally, a gateway 140 may be in communication with the LAN, and allow access to the internet.

Figures 4A, 4B, 4C:
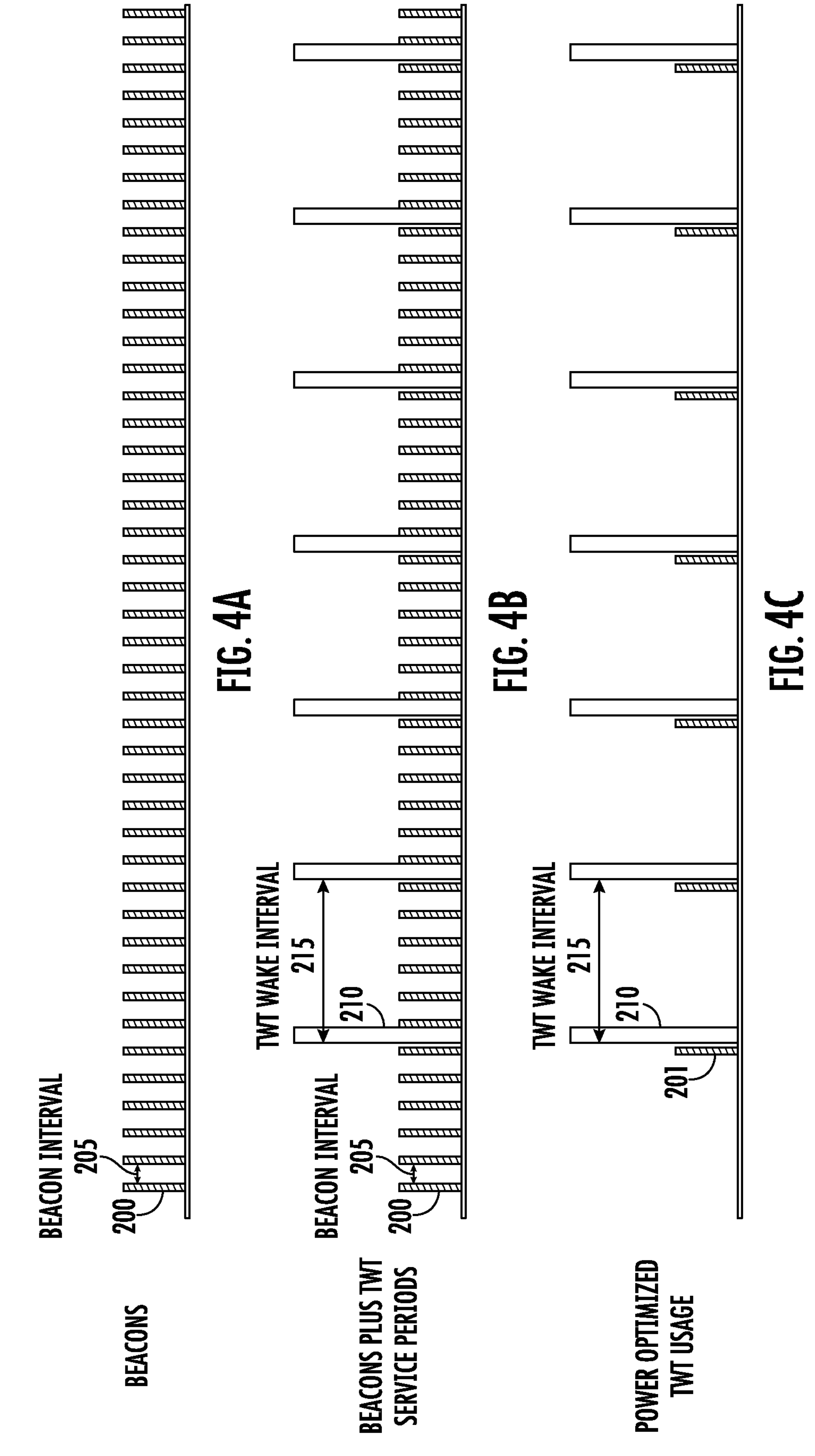
FIGS. 4A-4C shows timing diagrams showing beacons and TWT service periods.

FIGS. 4A-4C show a first enhancement to reduce power consumption of the low power Wi-Fi device 110. As shown in FIG. 4A, the access point 120 transmits beacons 200. These beacons 200 are multicast messages and may contain information that is relevant to the low power Wi-Fi device 110. These beacons 200 are transmitted periodically such that all devices in the Wi-Fi network 100 know when a beacon 200 will be transmitted. In some embodiments, the beacons 200 are transmitted every 100 milliseconds, which is referred to as a beacon interval 205. To conserve power, the low power Wi-Fi device 110 may only awaken for a fraction of these beacons 200. For example, the low power Wi-Fi device 110 may awaken for every $N^{th}$ beacon, wherein N is greater than 1.

The timing diagram of FIG. 4B shows the TWT service periods 210 superimposed on the timing diagram of FIG. 4A. Note that in this figure, the TWT wake interval 215 is greater than the beacon interval 205. Specifically, in FIG. 4, the TWT wake interval 215 is shown as being roughly equal to 6 beacon intervals 205. Further, in certain embodiments, the beacon 200 may contain an indication that the access point 120 has a packet or other information destined for the low power Wi-Fi device 110. This may be indicated in the Traffic Indication Map Information Element (TIM IE) of the beacon 200. The low power Wi-Fi device 110 may use this information to determine whether it should return to a wake state during the next TWT service period 210. However, as shown in FIG. 4B, even if the first beacon 200 contains this indication, the low power Wi-Fi device 110 is unable to receive this packet until its scheduled TWT service period 210. Therefore, there is no advantage to waking up for each beacon 200.

Thus, in one embodiment, shown in FIG. 4C, the low power Wi-Fi device 110 conserves power by only waking up for the beacon 200 that immediately precedes its TWT service period 210. This beacon may be referred to as the indicator beacon 201. Thus, in this embodiment, the low power Wi-Fi device 110 compares its TWT wake interval 215 to the beacon interval 205 and determines which beacons 200 occur immediately before its TWT service period 210. The low power Wi-Fi device 110 then only wakes for these indicator beacons 201. As a specific example, in FIG. 4C, the low power Wi-Fi device 110 determines that it should wake up every sixth beacon. Note that to be more efficient, the indicator beacon 201 should be the last beacon 200 that is received before the start of the TWT service period 210. However, in other embodiments, the low power Wi-Fi device 110 may utilize a different beacon as the indicator beacon 201. Note that this modification reduces the number of times that the low power Wi-Fi device 110 wakes up by a factor of 6. Note that if the TWT wake interval 215 is even longer, this power saving will be even larger.

Thus, in one embodiment, to save power, the low power Wi-Fi device 110 only wakes up for one beacon 200 during each TWT Wake interval 215, referred to as the indicator beacon 201. The processing unit 20 may use the TWT wake interval 215 and the beacon interval 205 to determine the value that may be stored in the timer 50 such that the low power Wi-Fi device 10 exits its low power mode once per TWT wake interval 215. As noted above, in some embodiments, the indicator beacon 201 is the last beacon transmitted before the start of the TWT service period 210. The processing unit 20 then parses the beacon 200 to determine if there is any pending data for this device. If there is not, the processing unit 20 returns to the sleep mode until the next indicator beacon 201. If there is data pending, the processing unit 20 configured the timer 50 such that it exits the low power mode during the next TWT service period 210. It then transmits a packet to the access point 120 to indicate that it is awake, and receives the packet from the access point 120.

Figures 5A, 5B:
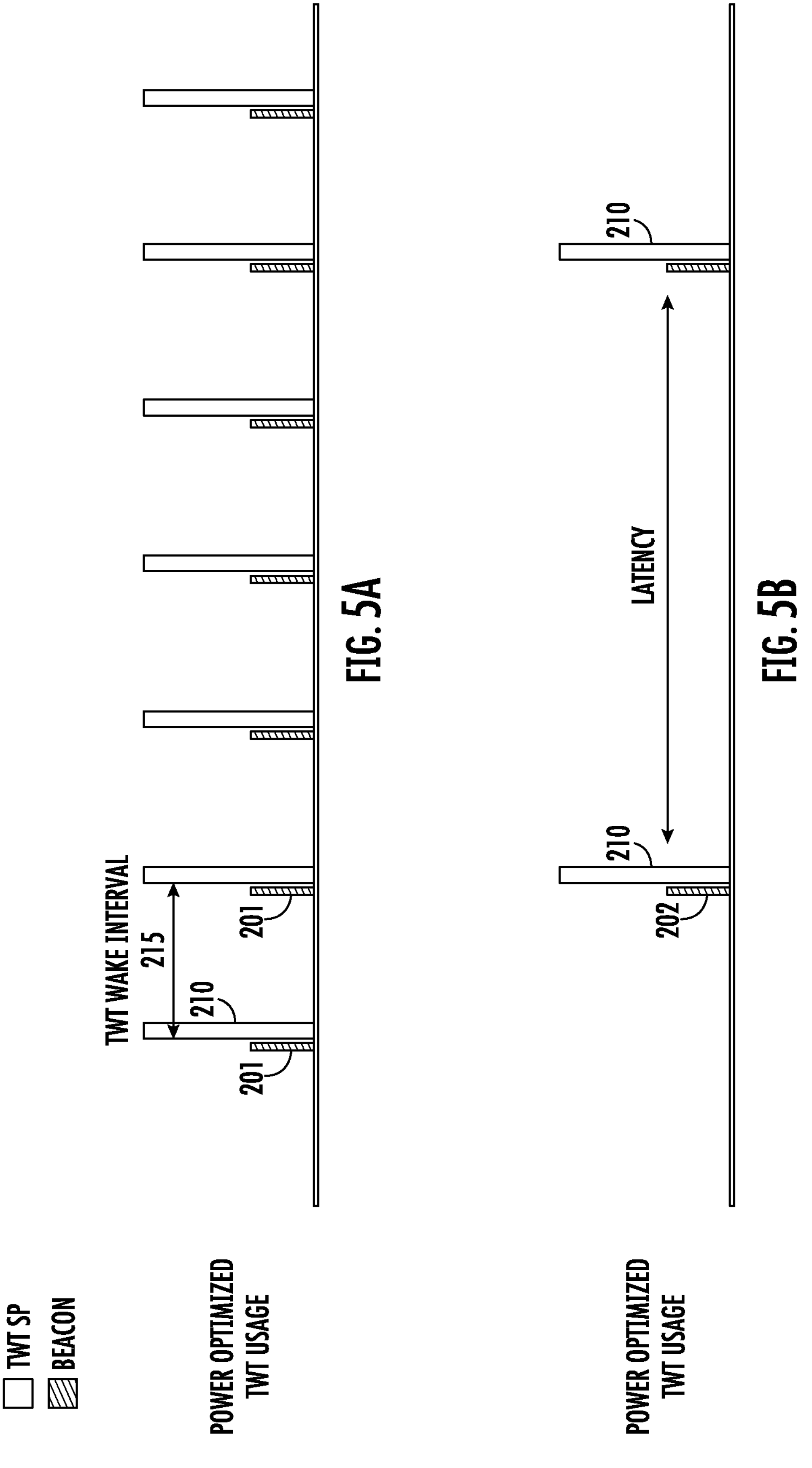
FIGS. 5A-5B show the use of allowable latency to control listening periods.

FIG. 5A-5B shows a further enhancement to the approach shown in FIGS. 4A-4C. In some embodiments, the low power Wi-Fi device 110 may be executing an application which may tolerate a large latency. Thus, in this embodiment, the low power Wi-Fi device 110 reduces the frequency of its listening periods even further. FIG. 5A shows the timing diagram of FIG. 4C. However, in some embodiments, the application executing on the low power Wi-Fi device 110 can withstand large delays. Thus, in this embodiment, the low power Wi-Fi device 110 may choose to only wake for every $N^{th}$ indicator beacon 201, wherein N is determined based on the amount of latency that the application executing on the low power Wi-Fi device 110 can tolerate.

Figure 6:
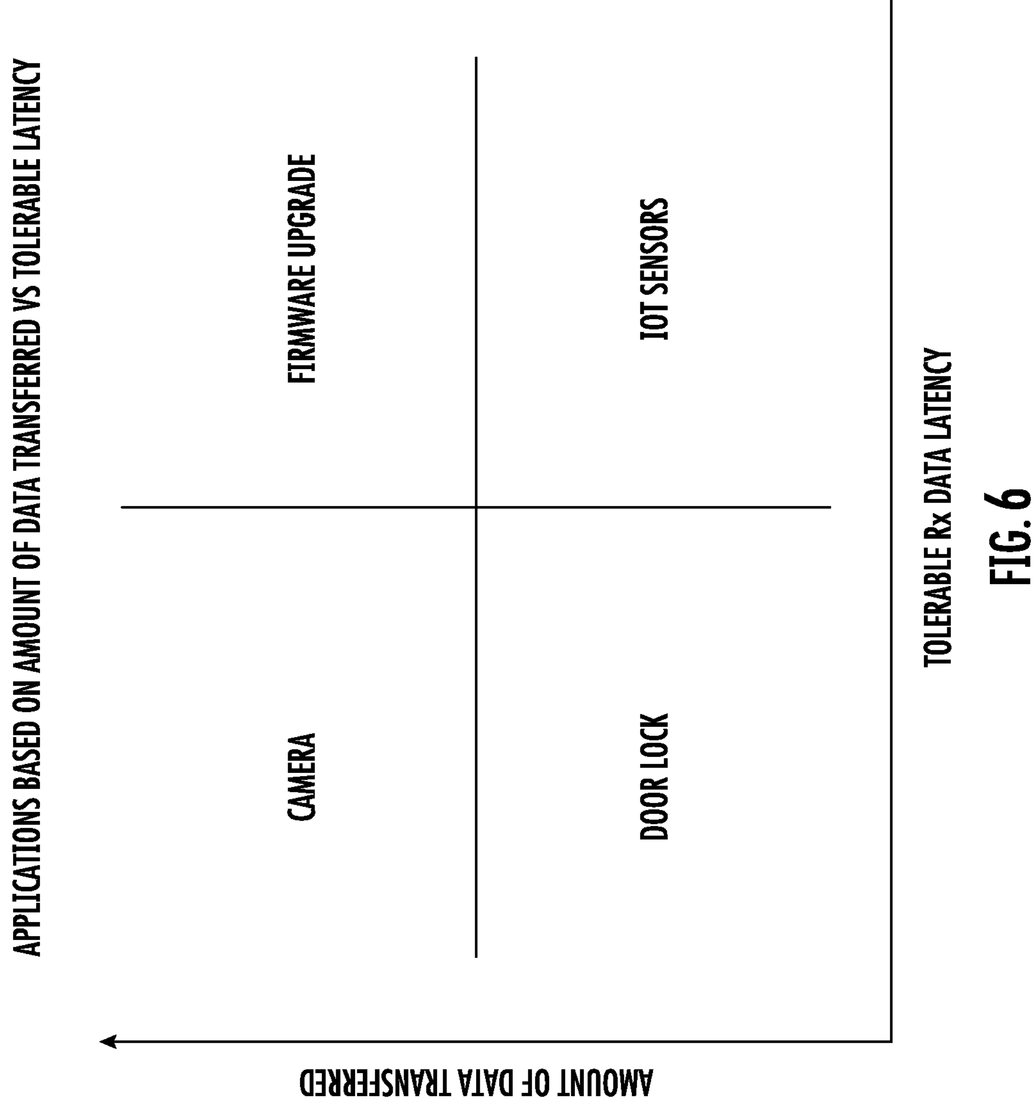
FIG. 6 shows a graph showing the requirements for different types of applications.

FIG. 6 shows a chart demonstrating various applications and their requirements, in terms of bandwidth and latency. This may be used when negotiating the TWT wake interval and the duration of the TWT service period. Further, this information may also be used to further reduce power consumption by selecting a value of N based on the allowable latency. For low latency applications, such as door locks and cameras, N may be 1, such that the low power Wi-Fi device 110 wakes up for every indicator beacon 201. However, for high latency applications, such as firmware upgrades and IoT sensors, the low power Wi-Fi device 110 may select a larger value of N. Note that N does not need to be an integer. In other words, the allowable latency does not need to be an integral multiple of the TWT wake interval 215.

Thus, FIG. 5A-5B show a further enhancement to the concept of reduced power consumption, by using knowledge of the allowable latency period to determine the frequency at which the low power Wi-Fi device 110 wakes up to receive beacons 200. Note that this embodiment requires the use of announced TWT, such that the access point 120 does not transmit any data to the low power Wi-Fi device 110 until the low power Wi-Fi device 110 first transmits a QoS data frame, a PS-Poll or an automatic power save deliver (APSD) trigger frame to the access point 120. The beacons that the low power Wi-Fi device 110 actually receives may be referred to as latency-dependent beacons 202, since their frequency is dependent on the latency period that can be tolerated. Note that the low power Wi-Fi device 110 may not wake up for the other beacons 200.

Figures 7A, 7B, 7C:
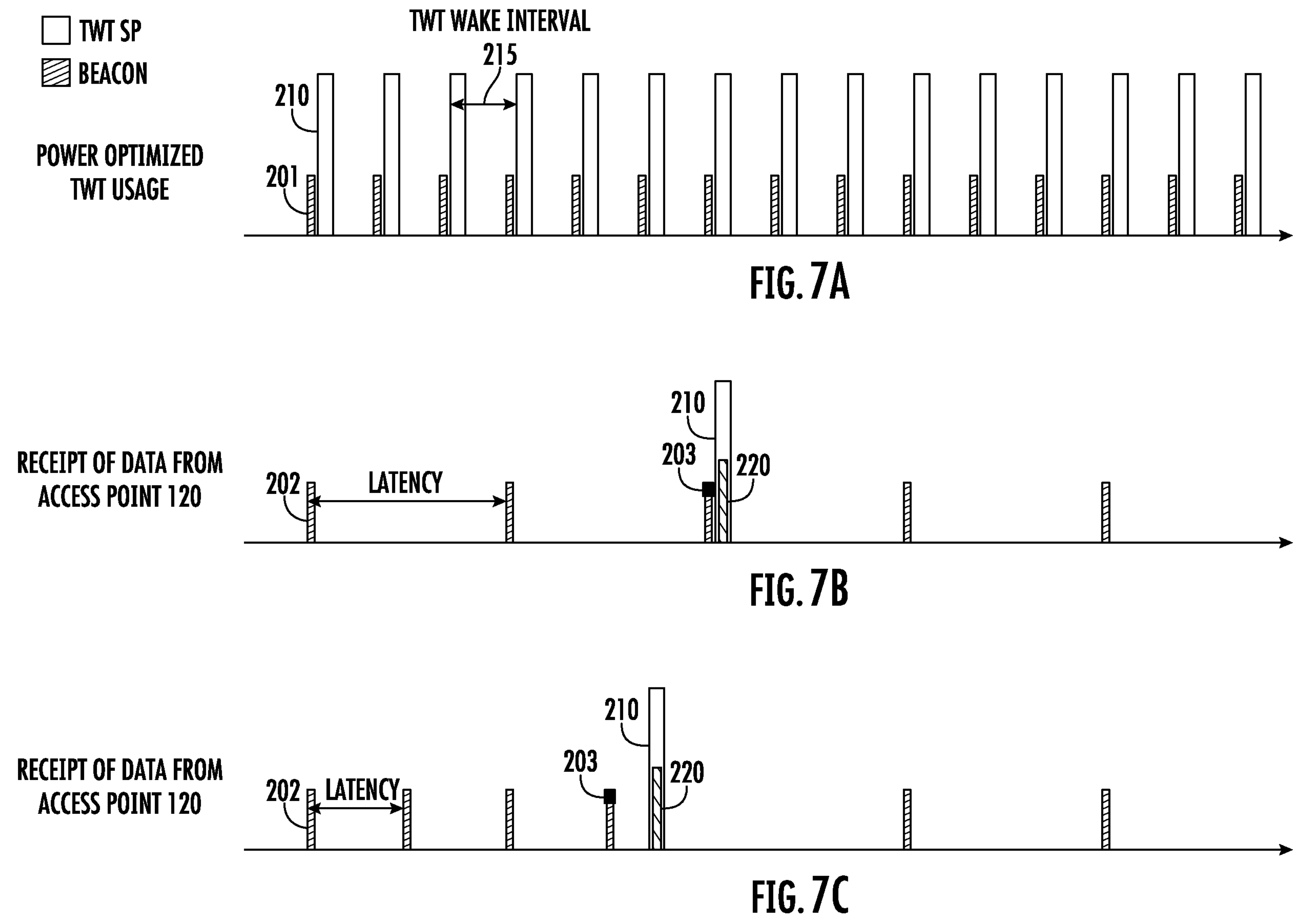
FIGS. 7A-7C shows a timing diagram illustrating the receipt of data from the access point using the concepts described herein.

FIGS. 7A-7C illustrate the sequence to receive data from the access point 120 using the concepts described above. First, FIG. 7A shows the indicator beacons 201 and the TWT service periods 210, as explained above with respect to FIG. 4C. FIG. 7B shows the use of latency, such that the low power Wi-Fi device 110 only receives latency-dependent beacons 202, which, in this figure, may be every 3rd indicator beacon 201. Note that in this figure, it is assumed that the latency period is an integral multiple of the TWT wake interval 215. This frequency may vary based on the needs of the application that is executing on the low power Wi-Fi device 110. One of these latency-dependent beacons 202 includes an indication 203 that the access point 120 has data to transmit to the low power Wi-Fi device 110. In response, the low power Wi-Fi device 110 wakes up during the TWT service period that is immediately following this latency-dependent beacon 202. The low power Wi-Fi device 110 then transmits a QOS data frame, a PS-Poll or APSD trigger frame to the access point 120 to indicate availability of the low power Wi-Fi device 110 in that particular service period to receive the packet(s). The access point 120 then transmits the packet 220 during this TWT service period. Note that the indication 203 may have been present on earlier beacons 200 that were not received by the low power Wi-Fi device 110. However, the latency incurred by waiting is acceptable in this embodiment.

FIG. 7C shows an embodiment where the latency period is not a multiple of the TWT wake interval 215. In this figure, the latency period is equal to 1.5 TWT wake intervals 215. Thus, in this embodiment, the low power Wi-Fi device 110 may exit the sleep mode after the latency period and listen to the next beacon 200, which is the latency-dependent beacon 202, even if it is not an indicator beacon 201. If the beacon does not include an indication 203 that there is any data for the low power Wi-Fi device 110, it returns to sleep mode and awakens after the next latency period. If however, the latency-dependent beacon 202 indicates that there is data available for this low power Wi-Fi device 110, the low power Wi-Fi device 110 exits the sleep mode during the next TWT service period 210 to receive the packet 220.

Thus, in these embodiments, the low power Wi-Fi device 110 may listen for beacons 200, based on the tolerable latency. The latency period may or may not be an integer multiple of the TWT wake interval 215. The beacons that the low power Wi-Fi device 110 listens to are referred to as latency-dependent beacons 202. Note that, in some embodiments, these latency-dependent beacons 202 may not be indicator beacons 201. If the latency-dependent beacon 202 does not indicate that the access point 120 has data for the low power Wi-Fi device 110, the low power Wi-Fi device 110 simply returns to sleep mode and wakes again for the next latency-dependent beacon 202. If the latency-dependent beacon 202 indicates that the access point 120 has data for the low power Wi-Fi device 110, the low power Wi-Fi device 110 wakes up during the TWT service period 210 that is immediately following this latency-dependent beacon 202. The low power Wi-Fi device 110 then transmits a QoS data frame, a PS-Poll or APSD trigger frame to the access point 120 to indicate that it is awake and ready to receive the packet. The access point 120 then transmits the packet 220 during this TWT service period. Note that this mode of operation reduces power consumption if the tolerable latency is greater than the TWT wake interval 215. As an alternative to this approach, the low power Wi-Fi device 110 may determine or modify its TWT wake interval 215 based on this allowable latency. In this case, the approach shown in FIGS. 4A-4C may be employed since the allowed latency and the TWT wake interval 215 would be equal.

Figures 8A, 8B, 8C:
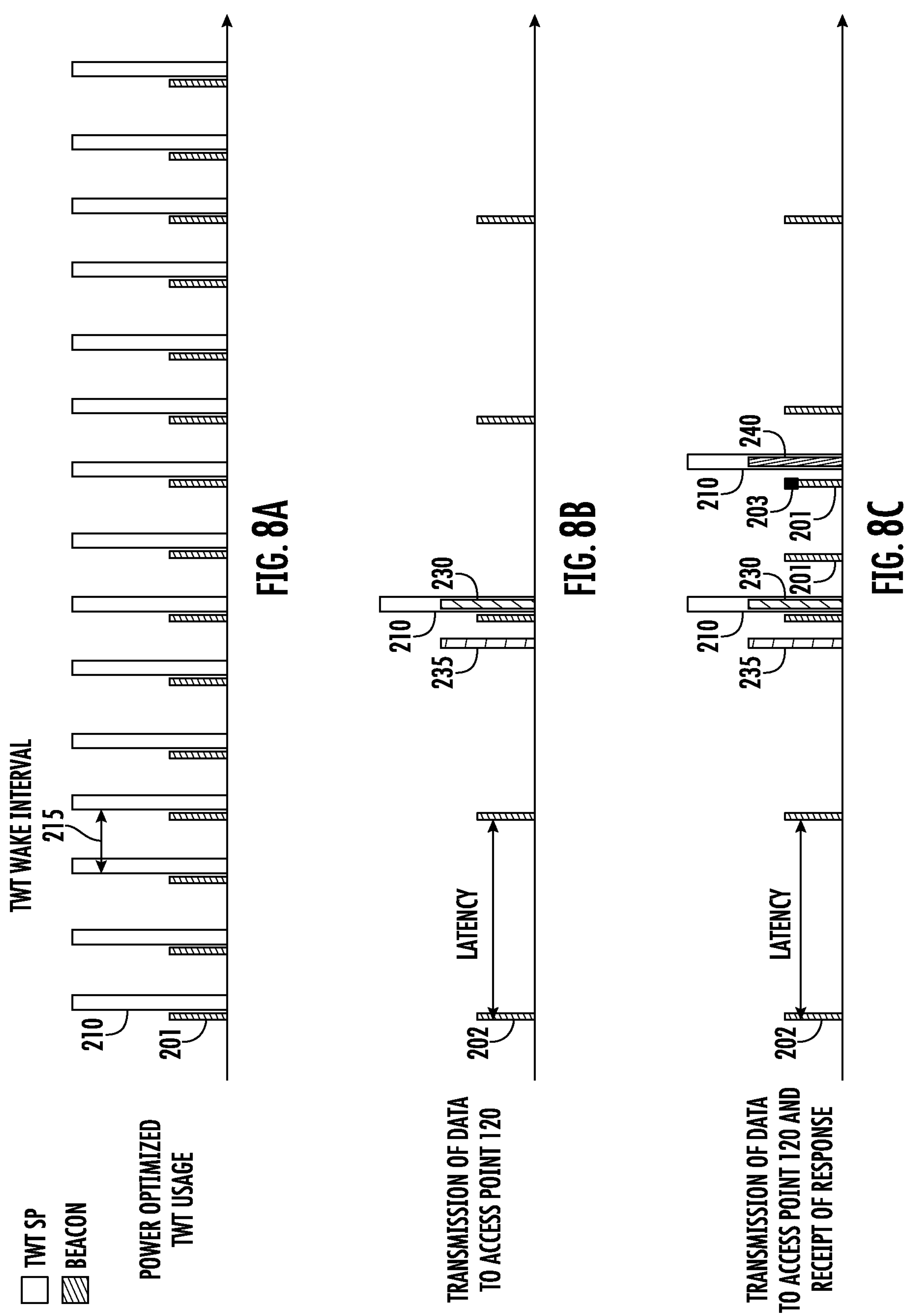
FIGS. 8A-8C shows a timing diagram illustrating the transmission of data to the access point using the concepts described herein.

FIGS. 8A-8C illustrate the sequence to transmit data to the access point 120 using the concepts described above. First, FIG. 8A shows the indicator beacons 201 and the TWT service periods 210, as explained above with respect to FIG. 4C. FIG. 8B shows the use of latency, such that the low power Wi-Fi device 110 only receives latency-dependent beacons 202. Note that this frequency may vary based on the needs of the application that is executing on the low power Wi-Fi device 110. Further, while FIG. 8B shows the latency as being an integer multiple of the TWT wake interval 215, it is understood that this approach also works if the latency is not a multiple of the TWT wake interval 215.

At some point, an application executing within the low power Wi-Fi device 110 may provide an indication 235 that it has data to transmit to the access point 120. This indication 235 is completely asynchronous to the activities occurring in the Wi-Fi network 100. The low power Wi-Fi device 110 may recognize this indication 235 prior to one of the latency-dependent beacons 202. It may then transmit a QOS data frame, a PS-Poll or APSD trigger frame to the access point 120 during the next TWT service period 210 to indicate that it is awake and ready to transmit a packet. The low power Wi-Fi device 110 then transmits the packet 230 during this TWT service period. In other embodiments, the low power Wi-Fi device 110 simply transmits the packet 230 without sending a trigger frame beforehand. Note that, because this latency is acceptable, the low power Wi-Fi device 110 does not need to check for or act on this indication 235 prior to the latency-dependent beacon 202. Rather, it simply waits until after the next latency-dependent beacon to transmit the packet 230. Note that, in another embodiment, the low power Wi-Fi device 110 may change its mode of operation after detecting the indication 235. For example, in one embodiment, the low power Wi-Fi device 110 may choose to send the packet 230 to the access point 120 during the next TWT service period 210, rather than waiting for the next latency-dependent beacon 202.

FIG. 8C shows a variation of the timing diagram shown in FIG. 8B. In this figure, the access point 120 may return a response packet 240 after receiving the packet 230 from the low power Wi-Fi device 110. It may be beneficial to receive this response as soon as possible. Thus, in this embodiment, the low power Wi-Fi device 110 modifies its mode of operation after transmitting the packet 230. For example, instead of only listening to the latency-dependent beacons 202, the low power Wi-Fi device 110 may listen to every indicator beacon 201, waiting for the indication 203. In other embodiments, the low power Wi-Fi device 110 may listen to every beacon 200, waiting for the indication 203. Once the indication 203 is detected, the low power Wi-Fi device 110 may then transmit a PS-Poll or APSD trigger frame to the access point 120 during the next TWT service period 210 to indicate that it is awake and ready to receive the response packet 240. The access point 120 then transmits the response packet 240 during this TWT service period 210. The low power Wi-Fi device 110 may then return to its default listening mode.

Figures 9A, 9B:
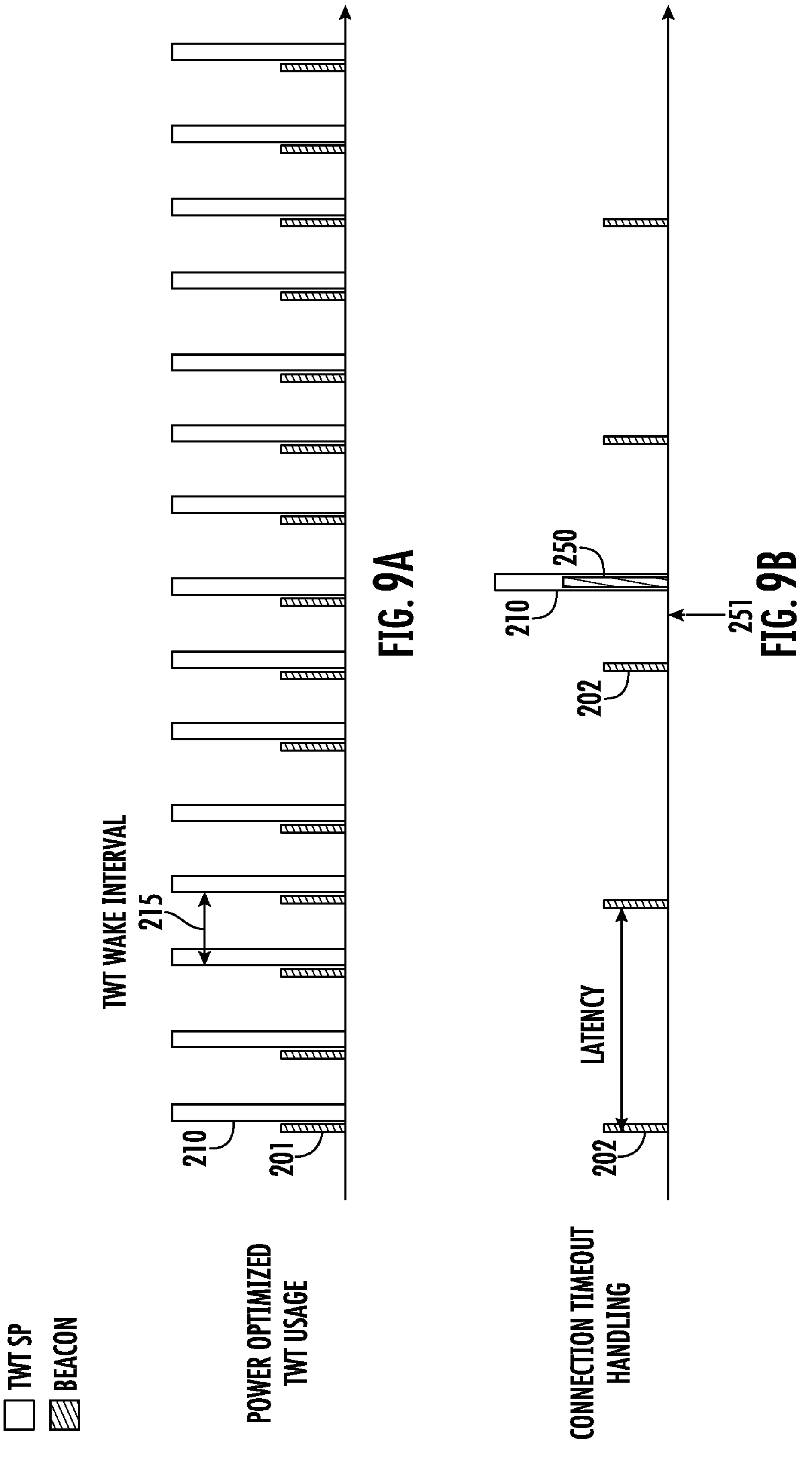
FIGS. 9A-9B shows a timing diagram illustrating the handling of connection timeouts using the concepts described herein.

FIGS. 9A-9B show the operation of the low power Wi-Fi device 110 with respect to connection timeout handling. FIG. 9A shows the indicator beacons 201 and the TWT service periods 210, as explained above with respect to FIG. 4C. FIG. 9B shows the handling of a connection timeout. Note that if the time since the last communication with the access point 120 exceeds a predetermined maximum allowable value, the access point 120 will assume that the low power Wi-Fi device 110 is no longer available and will terminate the connection. To avoid this, the low power Wi-Fi device 110 may include a timer 50 that measures the time since the last communication with the access point 120. In some embodiments, the low power Wi-Fi device 110 generates an interrupt or other notification 251 when the value of this internal timer approaches the maximum allowable time. This notification 251 may be used to alter the operation of the low power Wi-Fi device 110. Specifically, during normal operation, the low power Wi-Fi device 110 may only listen to the latency-dependent beacons 202. However, once the notification is received, the low power Wi-Fi device 110 may modify its operation so that it wakes up for the next TWT service period 210. In other words, the low power Wi-Fi device 110 may wake up earlier than the next latency-dependent beacon 202 in order to transmit the packet 250. In one embodiment, the notification 251 may occur at least one TWT wake interval 215 prior to the actual connection timeout, such that the packet 250 is transmitted prior to the connection timeout.

The previous description illustrates how some beacons may be ignored to reduce power consumption. However, in situations where the low power Wi-Fi device 110 remains in low power mode for very long durations, it is possible that the clock of the low power Wi-Fi device 110 may drift with respect to the clock of the access point 120. If this drift occurs, when the low power Wi-Fi device 110 exits low power mode and listens for a beacon, it may not be present.

Figure 10:
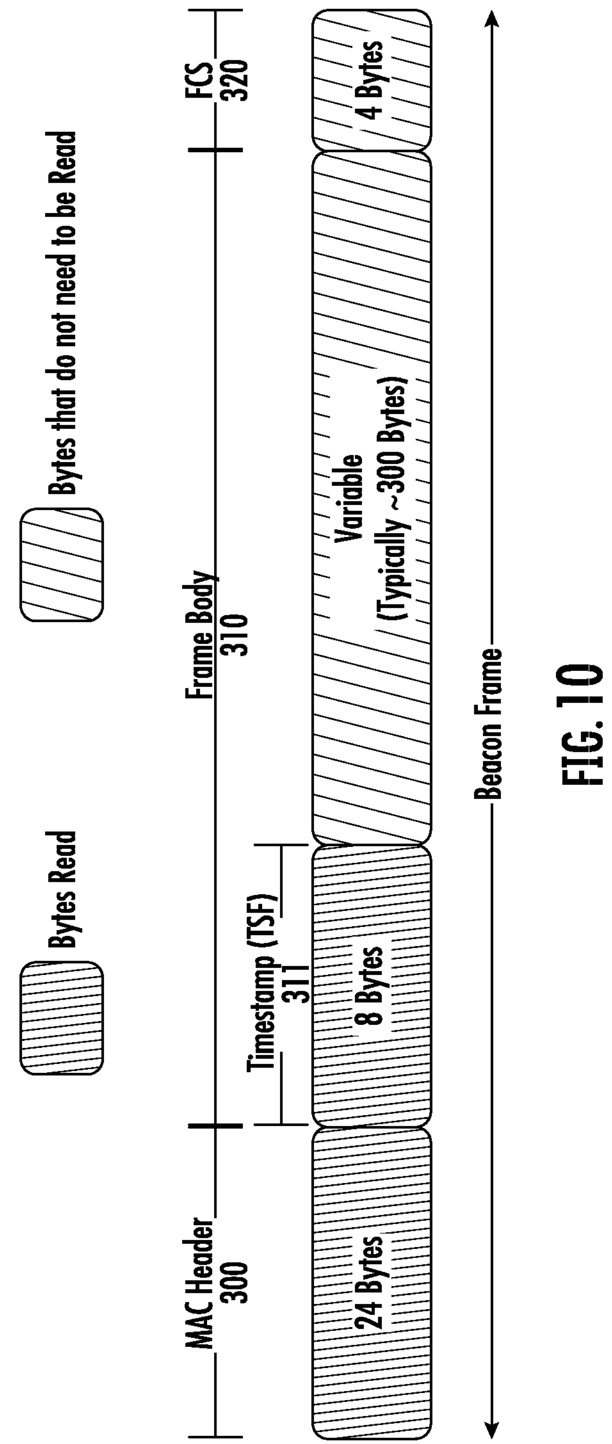
FIG. 10 is a diagram showing the format of a beacon.

Thus, in certain embodiments, it may be beneficial for the low power Wi-Fi device 110 to wake up to receive at least a portion of a beacon in order to maintain clock synchronization with the access point 120. FIG. 10 shows the format of a typical beacon. Note that the beacon begins with a MAC header 300. This MAC header 300 is 24 bytes in length. The MAC header 300 is followed by the frame body 310, which is variable in length and may be hundreds of bytes. The first field in the frame body 310 is the timestamp field (TSF) 311. This TSF 311 may be 8 bytes in length and is a number that represents the value of the clock used by the access point 120. Finally, a field check sequence (FCS) 320 follows the frame body 310. This FCS 320 is used to ensure that the rest of the beacon was properly received without errors.

Referring back to FIG. 5A-5B, note that in some embodiments, the low power Wi-Fi device 110 may stay in low power mode for an extended period of time, such as multiple TWT wake intervals 215. If, for example, the TWT wake interval is two seconds, and the low power Wi-Fi device 110 only wakes for every fifth TWT service period 210, it may be ten seconds between successive beacons that are received by the low power Wi-Fi device 110. This duration may be so long that the difference between the frequency of the low power Wi-Fi device 110 and the access point 120 causes the low power Wi-Fi device 110 to wake at a time when a beacon is not being transmitted.

Therefore, to address this issue, in certain embodiments, the low power Wi-Fi device 110 wakes for each latency-dependent beacon 202, as described above. However, in addition, the low power Wi-Fi device 110 also wakes to receive portions of other beacons. Specifically, referring to FIG. 10, the low power Wi-Fi device 110 receives at least the MAC header 300 and the TSF 311 before disabling its network interface. Note that the low power Wi-Fi device 110 may receive more than these 32 bytes; however, any additional bytes are not used by the processing unit 20.

Figures 11A, 11B:
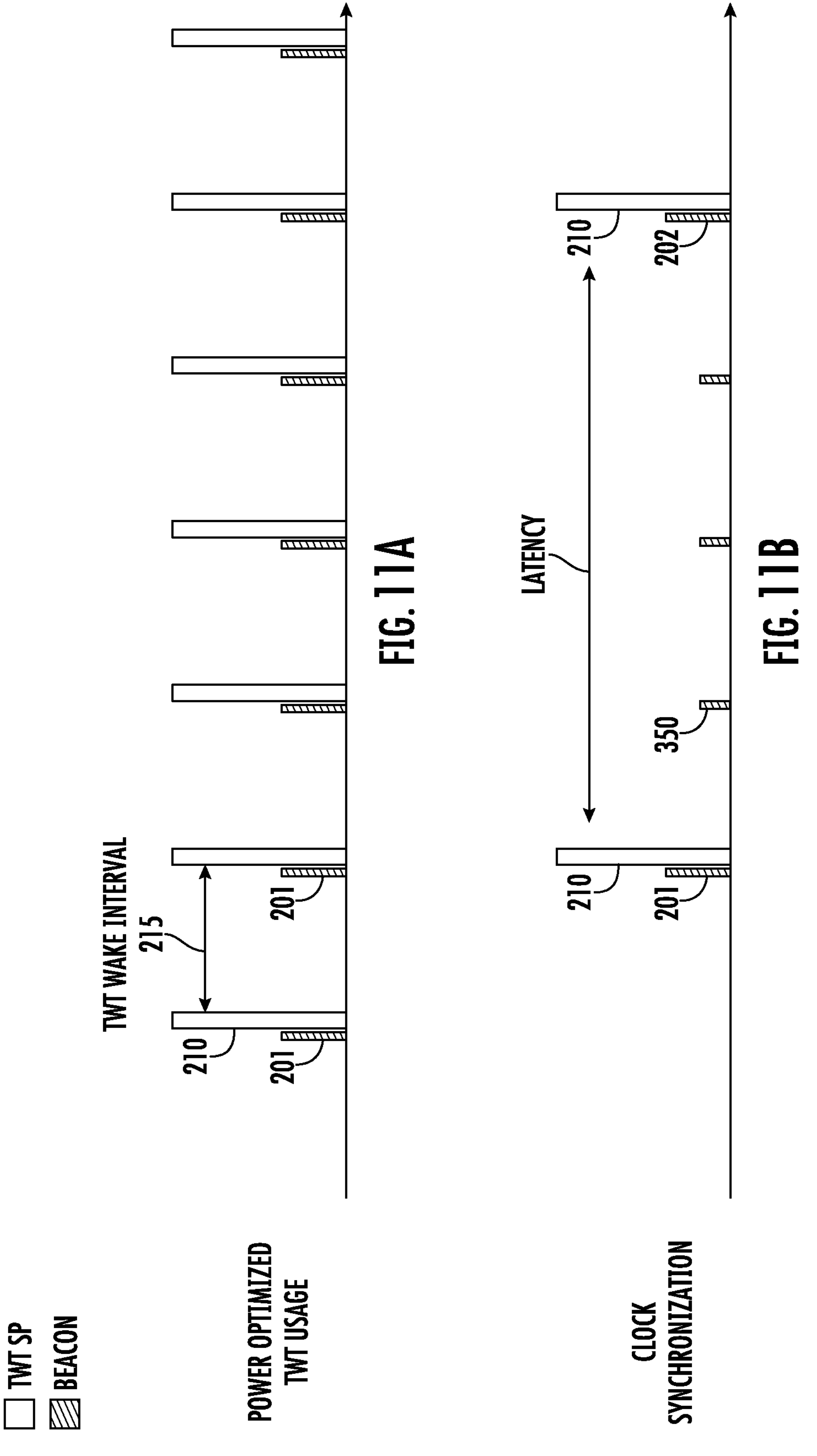
FIGS. 11A-11B is a timing diagram showing the operation of the target wake time (TWT) feature with Station in low power mode according to another embodiment.

FIG. 11A shows the indicator beacons 201 and the TWT service periods 210, as explained above with respect to FIG. 4C. FIG. 11B shows the operation of the low power Wi-Fi device 110 to maintain synchronization with the access point 120. As explained above, the low power Wi-Fi device 110 may wake up to receive latency-dependent beacons 202. In some embodiments, the latency-dependent beacons 202 may be every $N^{th}$ indicator beacon 201. In addition, the low power Wi-Fi device 110 may also exit the low power mode to receive at least a portion of other beacons 200, where that portion includes at least the MAC header 300 and the TSF 311. Since the low power Wi-Fi device 110 only receives a portion of these beacons, they may be referred to as truncated beacons 350. In some embodiments, these truncated beacons 350 may correspond to the indicator beacons 201 described earlier. For example, the low power Wi-Fi device 110 may exit low power mode for every $M^{th}$ indicator beacon 201, wherein M is an integer less than or equal to N, receive the MAC header 300 and the TSF 311 and then disable its network interface. In one embodiment, M may be 1, such that the low power Wi-Fi device 110 wakes up once per TWT wake interval 215 to receive a truncated beacon 350. In other embodiments, the truncated beacons 350 may be separated by a fixed amount, such as 1 second, which may or may not be related to the TWT wake interval 215. For example, every $N^{th}$ beacon 200 (regardless of whether it is an indicator beacon 201 or not) may be treated as a truncated beacon 350.

Figure 12:
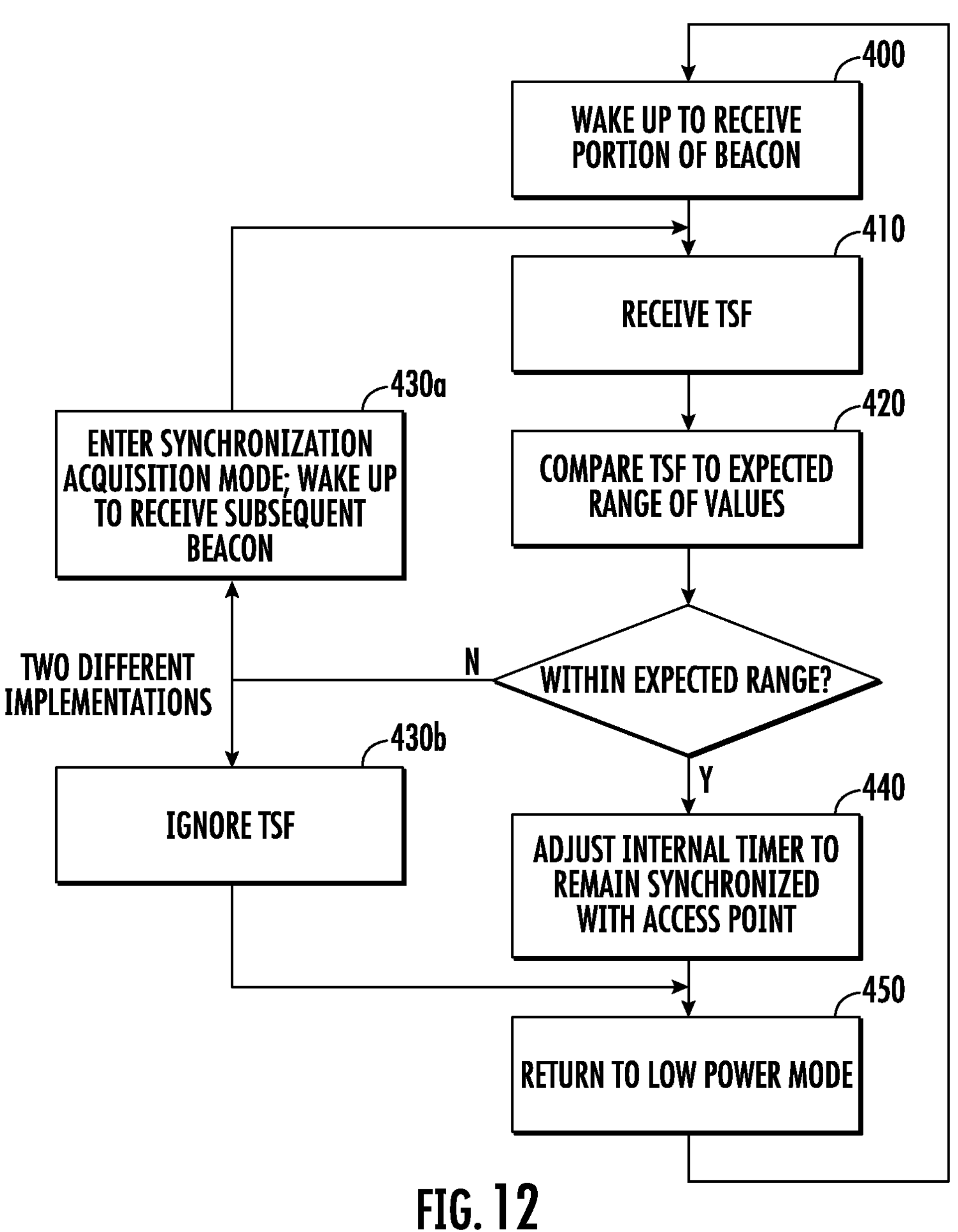
FIG. 12 is a flowchart showing the operation of the low power Wi-Fi device according to one embodiment.

Note that one issue associated with only receiving part of a beacon is the possibility that an error occurred in transmission, such that the TSF 311 is invalid. This may be handled in a plurality of ways. This is shown in the flow chart of FIG. 12. First, as shown in Box 400, the low power Wi-Fi device 110 receives a portion of the beacon 200. As noted above, this portion may terminate immediately after the TSF 311, or at a later time. As shown in Box 410, the low power Wi-Fi device 110 receives the TSF 311. In one embodiment, the low power Wi-Fi device 110 sets an expected range for the incoming time stamp. In other words, based on the previous value of the TSF 311 and the duration of time since that previous TSF 311, the low power Wi-Fi device 110 estimates a range of expected values of the TSF 311 that is being received. The low power Wi-Fi device 110 then compares the received value of the TSF 311 to this range, as shown in Box 420. If the received TSF 311 is within the range estimated by the low power Wi-Fi device 110, this TSF 311 is treated as valid. If the received TSF 311 is outside the range, this value is invalid. An invalid value of the TSF 311 may be handled in a number of ways. In one embodiment, shown in Box 430*b*, this invalid value of the TSF 311 is simply ignored, and the low power Wi-Fi device 110 returns to low power mode (see Box 450) and wakes for the next truncated beacon 350. In another embodiment, this invalid value of the TSF 311 triggers the low power Wi-Fi device 110 to enter a synchronization acquisition mode, as shown in Box 430*a*, where it attempts to receive the next beacon 200. In some embodiments, the low power Wi-Fi device 110 may attempt to receive the entirety of this next beacon 200. In other embodiments, it may simply receive the beacon 200 until it receives the TSF 311. It then checks if the TSF 311 is valid. Again, if it is invalid, this process is repeated. Once the low power Wi-Fi device 110 determines that the value of the TSF 311 is valid, it may adjust its clock to maintain synchronization with the access point 120, as shown in Box 440. It then returns to low power mode (see Box 450) until either the next truncated beacon 350 or the next latency-dependent beacon 202, whichever arrives sooner.

Note that the long sleep periods are only possible in some configurations. Specifically, these long sleep periods are compatible with 2.4 GHz Wi-Fi. However, 5 GHz Wi-Fi specifies some channels that are Dynamic Frequency Selection (DFS) channels. These channels are typically reserved for radar, but may be used for Wi-Fi as long as, if a radar signal is detected, the channel is vacated within the time-frame mandated by regulatory domains. Thus, in some embodiments, these long sleep periods should not be used with DFS channels. The DFS channels may utilize the approach described with respect to FIGS. 4A-4C. Non-DES channels may utilize the approaches described in FIGS. 5A-5B, and 11A-11B. Additionally, 6 GHz Wi-Fi designated certain channels as Automated Frequency Coordination (AFC) channels. Devices utilizing these channels need to be able to update their transmit power and/or switch channel to meet regulatory requirements. Thus, AFC channels may utilize the approach described in FIGS. 4A-4C. However, non-AFC channels may utilize the approaches described in FIGS. 5A-5B, and 11A-11B.

This system and method has many advantages. As noted above, the Target Wait Time (TWT) feature has the potential to reduce power consumption for low power Wi-Fi devices. The present disclosure described methods to further reduce power consumption by reducing the number of beacons that a low power Wi-Fi device listens for. In addition, by understanding the application that is being performed by the low power Wi-Fi device, power consumption may be further reduced by further limiting the number of beacons that are received. These reductions in power consumption also recognize the need to meet certain latency and throughput requirements. Further, the present disclosure also ensures that the connection is maintained, even when there is no data being transmitted to the low power Wi-Fi device. Additionally, through the use of truncated beacons, the low power Wi-Fi device is able to maintain synchronization with the access point, while minimizing the amount of time that its network interface is active. Specifically, a truncated beacon may be about 32 bytes, while an entire beacon may be about 350 bytes. By disabling the network interface after the TSF is received, power consumption is reduced by about 90% by using truncated beacons as compared to reception of the entire beacon.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of reducing power consumption in a low power Wi-Fi device, comprising:

negotiating target wait time (TWT) parameters with an access point, wherein the TWT parameters include a TWT wake interval duration, an announce mode of operation and a TWT wake duration, wherein the TWT wake duration defines a duration of a TWT service period, wherein a plurality of beacons are transmitted during each TWT wake interval;

estimating a tolerable latency period associated with the low power Wi-Fi device, wherein the latency period is longer than the TWT wake interval;

configuring the low power Wi-Fi device to exit a low power mode once per latency period to receive one beacon of the plurality of beacons from the access point; and waking periodically to receive a portion of a beacon, referred to as a truncated beacon, wherein the truncated beacon is less than an entire beacon and wherein the low power Wi-Fi device disables its network interface after receipt of a MAC header and a timestamp field and prior to receipt of the entire beacon.

2. The method of claim 1, wherein the periodic waking is based on time.

3. The method of claim 1, wherein the periodic waking occurs every $N^{th}$ beacon, where N is an integer.

4. The method of claim 1, wherein the periodic waking occurs once per TWT wake interval.

5. The method of claim 1, wherein the periodic waking occurs every $M^{th}$ TWT wake interval, where M is an integer.

6. The method of claim 1, wherein the low power Wi-Fi device wakes to receive at least one truncated beacon per latency period.

7. The method of claim 1, wherein the low power Wi-Fi device uses a timestamp disposed in the timestamp field to synchronize an internal clock to that of the access point.

8. The method of claim 7, wherein the low power Wi-Fi device verifies that the timestamp is valid prior to using the timestamp to synchronize an internal clock to that of the access point.

9. The method of claim 8, wherein the low power Wi-Fi device estimates an expected range of values of the timestamp based on a prior timestamp and a duration since the prior timestamp, and compares the expected range of values to the timestamp contained in the timestamp field of the truncated beacon.

10. The method of claim 9, wherein the low power Wi-Fi device ignores the timestamp if the timestamp is not within the expected range of values.

11. The method of claim 9, wherein the low power Wi-Fi device enters a synchronization acquisition mode if the timestamp is not within the expected range of values.

12. The method of claim 11, wherein in synchronization acquisition mode, the low power Wi-Fi device attempts to receive a next beacon.

13. A low power Wi-Fi device, comprising:

a Wi-Fi network interface;

a processing unit; and a memory device in communication with the processing unit comprising instructions, which when executed by the processing unit, cause the low power Wi-Fi device to:

negotiate target wait time (TWT) parameters with an access point, wherein the TWT parameters include a TWT wake interval duration, an announce mode of operation and a TWT wake duration, wherein the TWT wake duration defines a duration of a TWT service period;

estimate a tolerable latency period associated with the low power Wi-Fi device, wherein the latency period is longer than the TWT wake interval and wherein a plurality of beacons are transmitted during each latency period;

configure the low power Wi-Fi device to exit a low power mode once per latency period to receive one beacon from the access point; and wake periodically to receive a portion of a beacon, referred to as a truncated beacon, wherein the truncated beacon is less than an entire beacon and wherein the low power Wi-Fi device disables its network interface after receipt of a MAC header and a timestamp field and prior to receipt of the entire beacon.

14. The low power Wi-Fi device of claim 13, wherein the low power Wi-Fi device uses a timestamp disposed in the timestamp field of the truncated beacon to synchronize an internal clock to that of the access point.

15. The low power Wi-Fi device of claim 14, wherein the low power Wi-Fi device verifies that the timestamp is valid prior to using the timestamp to synchronize an internal clock to that of the access point.

16. The low power Wi-Fi device of claim 15, wherein the low power Wi-Fi device estimates an expected range of values of the timestamp based on a prior timestamp and a duration since the prior timestamp, and compares the expected range of values to the timestamp contained in the timestamp field of the truncated beacon.

17. The low power Wi-Fi device of claim 16, wherein the low power Wi-Fi device ignores the timestamp if the timestamp is not within the expected range of values.

18. The low power Wi-Fi device of claim 16, wherein the power low Wi-Fi device enters a synchronization acquisition mode if the timestamp is not within the expected range of values.

19. The low power Wi-Fi device of claim 18, wherein in synchronization acquisition mode, the low power Wi-Fi device attempts to receive a next beacon.

* * * * *